(12) United States Patent
Sano et al.

(10) Patent No.: US 11,270,407 B2
(45) Date of Patent: Mar. 8, 2022

(54) ELECTRONIC DEVICE, CONTROL METHOD, AND NON-TRANSITORY COMPUTER READABLE MEDIUM

(71) Applicant: CANON KABUSHIKI KAISHA, Tokyo (JP)

(72) Inventors: Genjiro Sano, Yokohama (JP); Shin Murakami, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 162 days.

(21) Appl. No.: 16/709,573

(22) Filed: Dec. 10, 2019

(65) Prior Publication Data
US 2020/0193559 A1 Jun. 18, 2020

(30) Foreign Application Priority Data

Dec. 12, 2018 (JP) .............................. JP2018-232359

(51) Int. Cl.
*G06T 3/40* (2006.01)
*G06F 3/14* (2006.01)
(Continued)

(52) U.S. Cl.
CPC .......... *G06T 3/0056* (2013.01); *G06F 3/0482* (2013.01); *G06F 3/14* (2013.01);
(Continued)

(58) Field of Classification Search
CPC ......... G06T 3/0056; G06T 3/40; G06T 5/002; G06T 2200/24; G06T 2207/30201;
(Continued)

(56) References Cited

U.S. PATENT DOCUMENTS 6,769,131 B1 7/2004 Tanaka et al.
9,953,034 B1 * 4/2018 Parlikar ................. G06F 16/40
(Continued)

FOREIGN PATENT DOCUMENTS

CN 102457716 A 5/2012
CN 102945276 A 2/2013
(Continued)

OTHER PUBLICATIONS

The above documents were cited in a British Search Repod dated May 22, 2020 which is enclosed, that issued in the corresponding British Patent Application No. 1917830.0.
(Continued)

*Primary Examiner* — Jitesh Patel
(74) *Attorney, Agent, or Firm* — Cowan, Liebowitz & Latman, P.C.

(57) ABSTRACT

An electronic device according to the present invention, includes at least one memory and at least one processor which function as: a reading unit configured to read a candidate image to be posted; and a display controlling unit configured to perform control to display a post creation screen including the candidate image such that in a case where the read candidate image is not an image for VR display, and an image for normal display, a specific display item for performing a hiding process of hiding a part of an image is not displayed on the post creation screen, and in a case where the candidate image is an image for VR display, the specific display item is displayed on the post creation screen.

21 Claims, 9 Drawing Sheets

(51) Int. Cl.
*G06F 3/0482* (2013.01)
*G06T 3/00* (2006.01)
*G06T 5/00* (2006.01)
*G06F 21/62* (2013.01)
*G06K 9/00* (2022.01)

(52) U.S. Cl.
CPC ..... *G06F 21/6209* (2013.01); *G06K 9/00228* (2013.01); *G06T 3/40* (2013.01); *G06T 5/002* (2013.01); *G06F 2203/04803* (2013.01); *G06T 2200/24* (2013.01); *G06T 2207/30201* (2013.01)

(58) Field of Classification Search
CPC ...... G06F 3/0482; G06F 3/14; G06F 21/6209; G06F 2203/04803; G06K 9/00228
See application file for complete search history.

(56) References Cited

U.S. PATENT DOCUMENTS

| | | | |
|---|---|---|---|
| 10,127,632 | B1 | 11/2018 | Burke et al. |
| 2006/0224940 | A1* | 10/2006 | Lee ........................ G11B 27/34 715/203 |
| 2013/0063771 | A1 | 3/2013 | Song et al. |
| 2015/0040035 | A1* | 2/2015 | Neelakant ............. H04L 65/403 715/753 |
| 2015/0271396 | A1* | 9/2015 | Lee .................... H04N 5/23216 348/222.1 |
| 2016/0117829 | A1* | 4/2016 | Yoon .................. H04N 5/23229 348/222.1 |
| 2019/0197599 | A1* | 6/2019 | Zia ..................... G06Q 30/0643 |
| 2019/0347144 | A1* | 11/2019 | Chen ....................... H04L 67/30 |

FOREIGN PATENT DOCUMENTS

| | | |
|---|---|---|
| CN | 104348704 A | 2/2015 |
| CN | 104981762 A | 10/2015 |
| CN | 106228136 A | 12/2016 |
| CN | 106488109 A | 3/2017 |
| CN | 108805810 A | 11/2018 |
| EP | 2568696 A2 | 3/2013 |
| JP | 2012-073680 A | 4/2012 |
| JP | 2013-125218 A | 6/2013 |
| JP | 2014-165866 A | 9/2014 |

OTHER PUBLICATIONS

Ben Samples, How to share 360-degree content on social media, Nov. 3, 2017, (14 pages total).

Mark Metry, 6 Best Places Online to Share Your VR 360 Content, Mar. 27, 2018, (14 pages total).

Li Haiting et al.,"Research on Privacy Information Hiding in Panoramic Map Bulletin of Surveying and Mapping, Issue 12", Dec. 30, 2015, pp. 74-76.

The above documents were cited in a Jun. 30, 2021 Chinese Office Action, which is enclosed with an English Translation, that issued in Chinese Patent Application No. 201911275745.8.

* cited by examiner

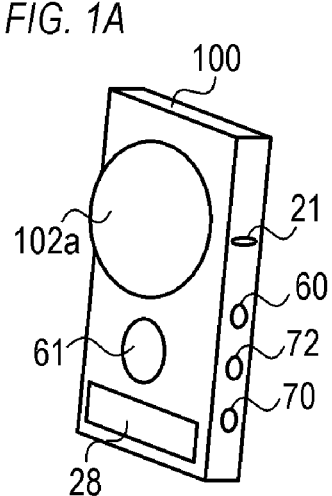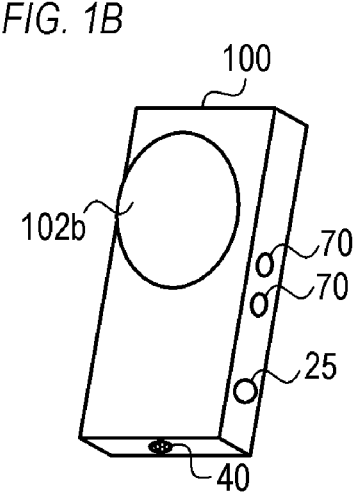

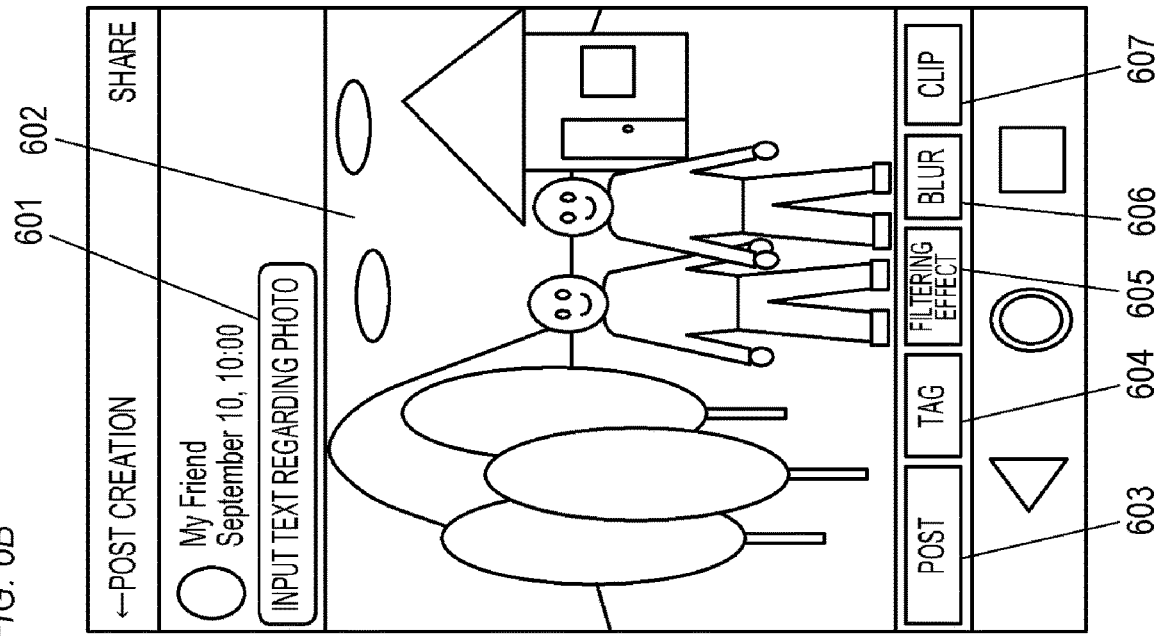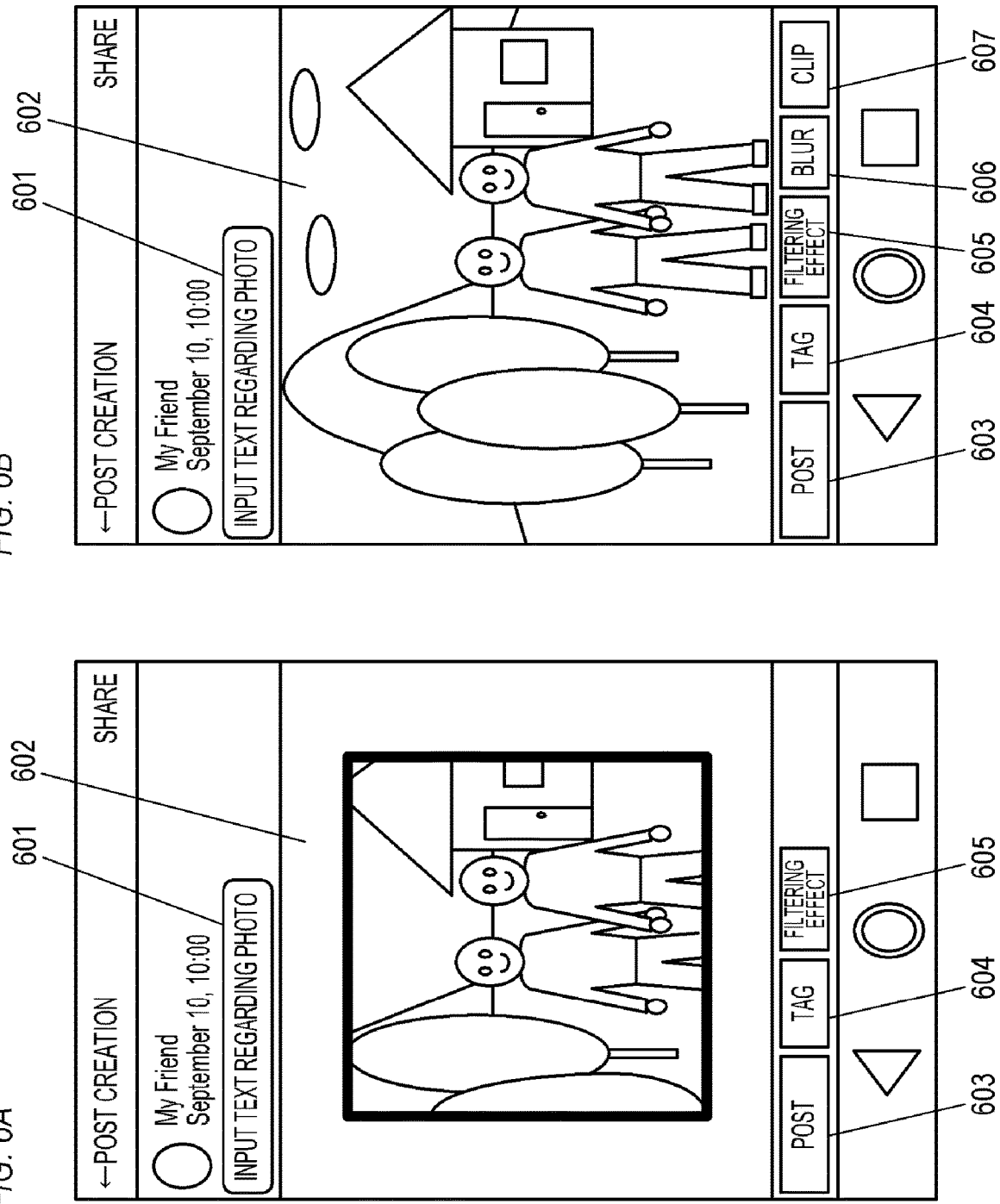

ELECTRONIC DEVICE, CONTROL METHOD, AND NON-TRANSITORY COMPUTER READABLE MEDIUM

BACKGROUND OF THE INVENTION

Field of the Invention

The present invention relates to a control technique when uploading an image to a server and making the image viewable by a large number of users.

Description of the Related Art

In recent years, image sharing methods such as posting an image from a user terminal to a server of a social networking service (SNS) site or the like and making the image viewable by a large number of users have become prevalent. Japanese Patent Application Laid-open No. 2012-73680 proposes displaying, on a post creation screen of an image, an image to be posted as well as a plurality of buttons for issuing an instruction to perform each of a plurality of correction processes (trimming, a red-eye prevention process, a skin enhancement process, and size reduction) with respect to the posted image.

In addition, imaging apparatuses which enable a celestial image (an omnidirectional image or a full circumference image) of 360 degrees to be readily photographed by one shot are known. Furthermore, imaging apparatuses capable of photographing ranges of 180 degrees or more, which are less than 360 degrees but nevertheless wide ranges, are known. A display method (VR viewing) is known in which a part of such an image is displayed as a display range to be changed on the basis of an operation by a user or an attitude change of a display apparatus. With such a display method, a display range can be mainly changed in rotation directions of two axes, namely, a direction of rotation within a horizontal plane with a zenith as a center and a direction of rotation in a vertical direction (a direction of changing an elevation or a depression angle). Japanese Patent Application Laid-open No. 2014-165866 proposes having a user set a display prohibited region for purposes of preventing an invasion of privacy and the like inside an image obtained by a wide-range imaging unit and performing image processing (a hiding process) such as blacking out or mosaicking on a region corresponding to the display prohibited region.

A normal image that is not an image (a VR image) to be subjected to VR viewing is highly likely to be photographed so that only a necessary object is included in the image by adjusting a composition upon photography and, therefore, it is unlikely that an object who must be hidden for the purpose of privacy protection or the like is present in the image. On the other hand, in the case of a VR image, since a wide range is photographed, it is highly likely that an unnecessary object (portion) or an object (portion) that must be hidden for the purpose of privacy protection or the like is present in the image. When a VR image in a state where a hiding process has not been performed on an object to be hidden or a VR image capturing an unnecessary object is uploaded and becomes viewable by a plurality of users, inconveniences such as a failure to protect privacy may arise.

SUMMARY OF THE INVENTION

The present invention has been made in consideration of the problems described above, and provides an electronic device which more reliably or more readily prevents a portion not intended to be shared in an image to be subjected to VR display from becoming viewable by a plurality of user before the image is shared, and to provide a control method of the electronic device.

An electronic device according to the present invention, includes at least one memory and at least one processor which function as:

a reading unit configured to read a candidate image to be posted; and a display controlling unit configured to perform control to display a post creation screen including the candidate image such that in a case where the read candidate image is not an image for VR display, and an image for normal display, a specific display item for performing a hiding process of hiding a part of an image is not displayed on the post creation screen, and in a case where the candidate image is an image for VR display, the specific display item is displayed on the post creation screen.

Further features of the present invention will become apparent from the following description of exemplary embodiments with reference to the attached drawings.

BRIEF DESCRIPTION OF THE DRAWINGS

FIGS. 1A and 1B are external views of a digital camera.

FIGS. 6A and 6B show examples of a post creation screen (an uploading screen);

DESCRIPTION OF THE EMBODIMENTS

Figure 1C:
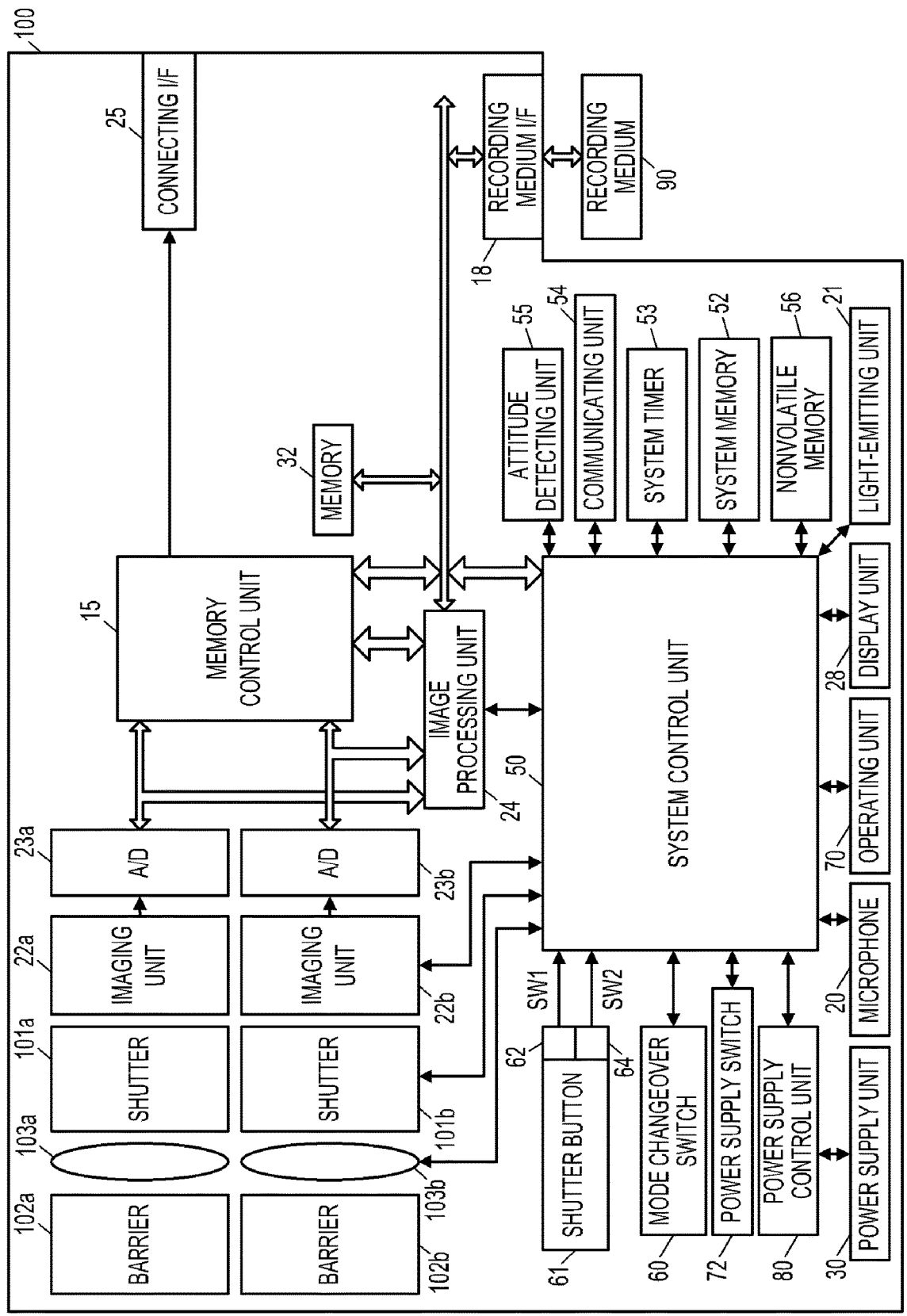
FIG. 1C is a block diagram of the digital camera.

Hereinafter, a preferred embodiment of the present invention will be described with reference to the drawings. FIG. 1A is a front perspective view (an external view) of a digital camera 100 (an imaging apparatus). FIG. 1B is a rear perspective view (an external view) of the digital camera 100. The digital camera 100 is an omnidirectional camera (a fully celestial camera).

A barrier 102a is a protective window for a front camera portion having the front of the digital camera 100 as a photography range. The front camera portion is a wide-angle camera portion having, for example, a wide range of 180 vertical and horizontal angles or more on a front side of the digital camera 100 as a photography range. A barrier 102b is a protective window for a rear camera portion having the rear of the digital camera 100 as a photography range. The rear camera portion is a wide-angle camera portion having, for example, a wide range of 180 vertical and horizontal angles or more on a rear side of the digital camera 100 as a photography range.

A display unit 28 displays various types of information. A shutter button 61 is an operating unit (an operating member) for issuing a photography instruction. A mode changeover switch 60 is an operating unit for switching among various modes. A connecting I/F 25 is a connector for connecting a connecting cable to the digital camera 100 and, using the connecting cable, external devices such as a smartphone, a personal computer, a television set, and the like are connected to the digital camera 100. An operating unit 70 refers to various switches, buttons, dials, touch sensors, or the like for receiving various types of operations from a user. A power supply switch 72 is a push button for switching a power supply on and off.

A light-emitting unit 21 is a light-emitting member such as a light-emitting diode (LED) and notifies the user of various states of the digital camera 100 through light emission patterns, light emission colors, or the like. A fixing unit 40 is, for example, a tripod screw hole that is used to fix and install the digital camera 100 with a fixing tool such as a tripod.

FIG. 1C is a block diagram showing a configuration example of the digital camera 100.

The barrier 102a covers an imaging system (a photographic lens 103a, a shutter 101a, an imaging unit 22a, and the like) of the front camera portion to prevent the imaging system from being stained or damaged. The photographic lens 103a refers to a lens group including a zoom lens and a focusing lens and is a wide-angle lens. The shutter 101a is a shutter having a diaphragm function for adjusting an amount of incidence of object light into the imaging unit 22a. The imaging unit 22a is an imaging element (an image sensor) constituted by a device such as a CCD or a CMOS which converts an optical image into an electrical signal. An A/D converter 23a converts an analog signal output from the imaging unit 22a into a digital signal. Alternatively, an outside surface of the photographic lens 103a may be exposed and other parts of the imaging system (the shutter 101a and the imaging unit 22a) may be prevented from being stained or damaged by the photographic lens 103a without providing the barrier 102a.

The barrier 102b covers an imaging system (a photographic lens 103b, a shutter 101b, an imaging unit 22b, and the like) of the rear camera portion to prevent the imaging system from being stained or damaged. The photographic lens 103b refers to a lens group including a zoom lens and a focusing lens and is a wide-angle lens. The shutter 101b is a shutter having a diaphragm function for adjusting an amount of incidence of object light into the imaging unit 22b. The imaging unit 22b is an imaging element constituted by a device such as a CCD or a CMOS which converts an optical image into an electrical signal. An A/D converter 23b converts an analog signal output from the imaging unit 22b into a digital signal. Alternatively, an outside surface of the photographic lens 103b may be exposed and other parts of the imaging system (the shutter 101b and the imaging unit 22b) may be prevented from being stained or damaged by the photographic lens 103b without providing the barrier 102b.

A VR (Virtual Reality) image is picked up by the imaging unit 22a and the imaging unit 22b. A VR image is assumed to be an image of which VR display (display in a "VR viewing" display mode) can be performed. VR images are assumed to include an omnidirectional image (a fully celestial image) picked up by an omnidirectional camera (a fully celestial camera) and a panoramic image having a wider video range (a wider valid video range) than a display range that can be displayed at one time on the display unit. VR images include moving images and live view images (images acquired approximately in real time from a camera) in addition to still images. A VR image has a maximum video range (a maximum valid video range) corresponding to a visual field of 360 degrees in a vertical direction (a vertical angle, an angle from a zenith, an elevation, a depression angle, an elevation angle, or a pitch angle) and 360 degrees in a horizontal direction (a horizontal angle, an azimuth, or a yaw angle).

In addition, it is assumed that VR images include images with a wider angle of view (a wider visual field range) than an angle of view that can be photographed by an ordinary camera or images with a wider video range (a wider valid video range) than a display range that can be displayed at one time on the display unit even when the visual field of the images is less than 360 degrees in the vertical direction and less than 360 degrees in the horizontal direction. For example, an image photographed by a fully celestial camera capable of photographing an object corresponding to a visual field (an angle of view) of 360 degrees in the horizontal direction (a horizontal angle or an azimuth) and 210 degrees in the vertical direction centered on a zenith is a type of a VR image. In addition, for example, an image photographed by a camera capable of photographing an object corresponding to a visual field (an angle of view) of 180 degrees in the horizontal direction (a horizontal angle or an azimuth) and 180 degrees in the vertical direction centered on the horizontal direction is a type of a VR image. In other words, an image having a video range corresponding to a field of view of 160 degrees (±80 degrees) or more in both the vertical direction and the horizontal direction and having a video range that is wider than a range that can be viewed at one time by a human being is a type of a VR image.

By performing VR display (display in the "VR viewing" display mode) of the VR image, changing an attitude of a display apparatus (a display apparatus for displaying the VR image) in a horizontal rotation direction enables an omnidirectional video without any seams in the horizontal direction (the horizontal rotation direction) to be viewed. In the vertical direction (a vertical rotation direction), although an omnidirectional video without any seams can be viewed in a range of ±105 degrees with respect to directly above (the zenith), a range exceeding 105 degrees from directly above constitutes a blank region in which a video is not present. A VR image can be described as "an image of which a video range is at least a part of a virtual space (a VR space)".

VR display (VR viewing) refers to a display method (a display mode) of displaying a video of a visual field range in accordance with an attitude of the display apparatus among a VR image and in which a display range can be changed. When wearing and viewing a head mounted display (HMD) that is a display apparatus, a video of a visual field range in accordance with an orientation of the head of the user is to be displayed. For example, let us assume that a video with a viewing angle (an angle of view) centered on 0 degrees in the horizontal direction (a specific azimuth such as north) and 90 degrees in the vertical direction (90 degrees from the zenith or, in other words, horizontal) at a certain point in time in a VR image is being displayed. When front and back of the attitude of the display apparatus is reversed from this state (for example, when a display surface is changed from facing south to facing north), the display range is changed to a video with a viewing angle centered on 180 degrees in the horizontal direction (an opposite azimuth such as south) and 90 degrees in the vertical direction (horizontal) in the same VR image. This means that, in a case where the user is viewing the HMD, when the user turns his or her head from north to south (in other words, when the user turns around), the video displayed on the HMD also changes from a northward video to a southward video. Such a VR display enables the user to be provided with a sensation (a sense of immersion) as though the user is visually present inside the VR image (inside the VR space). A smartphone mounted to VR goggles (a head mount adapter) can be considered a type of HMD.

It should be noted that a display method of a VR image is not limited to the method described above. A configuration may be adopted in which a display range is moved (scrolled) in accordance with a user operation with respect to a touch panel, a directional button, or the like instead of an attitude change. A configuration may be adopted in which, during VR display (in the "VR viewing" display mode), a display range can be changed in accordance with a touch-move with respect to the touch panel, a drag operation with respect to a mouse or the like, a depression of a directional button, or the like in addition to changing the display range in accordance with an attitude change.

An image processing unit 24 performs a prescribed resizing process or a prescribed color conversion process such as pixel interpolation or reduction with respect to data from the A/D converter 23a or the A/D converter 23b or data from a memory control unit 15. In addition, the image processing unit 24 performs a prescribed computing process using image data of a picked-up image. A system control unit 50 performs exposure control and ranging control on the basis of a computation result obtained by the image processing unit 24. Accordingly, an AF (automatic focusing) process, an AE (automatic exposure) process, and an EF (preliminary light emission before flash) process in a TTL (through-the-lens) system are performed. The image processing unit 24 further performs a prescribed computing process using image data of a picked-up image and performs an AWB (automatic white balance) process in the TTL system on the basis of an obtained computation result. In addition, the image processing unit 24 performs basic image processing on two images (two fisheye images, two wide-angle images) obtained from the A/D converter 23a and the A/D converter 23b, and performs an image connecting process of synthesizing the two images having been subjected to the basic image processing to generate a single VR image. Furthermore, the image processing unit 24 performs an image clipping process, an extending process, distortion correction, or the like for realizing VR display of the VR image during VR display in a live view or during playback, and performs rendering in which a processing result is rendered on a VRAM of a memory 32.

In the image connecting process, the image processing unit 24 uses one of the two images as a reference image and the other as a comparison image, calculates an amount of deviation between the reference image and the comparison image for each area by a pattern matching process, and detects a connection position where the two images are to be connected on the basis of the amount of deviation for each area. The image processing unit 24 corrects distortion of each image by geometric conversion in consideration of the detected connection position and lens characteristics of each optical system, and converts each image into an image in a fully celestial format (a fully celestial image format). In addition, by synthesizing (blending) the two images in the fully celestial format, the image processing unit 24 generates a single fully celestial image (a single VR image). The generated fully celestial image is an image using, for example, equidistant cylindrical projection, and a position of each pixel in the fully celestial image can be associated with coordinates on a surface of a sphere (a VR space).

Output data from the A/D converters 23a and 23b is written into the memory 32 via the image processing unit 24 and the memory control unit 15 or via the memory control unit 15 without involving the image processing unit 24. The memory 32 stores image data obtained by the imaging units 22a and 22b and converted into digital data by the A/D converters 23a and 23b and image data to be output to an external display from the connecting I/F 25. The memory 32 has sufficient storage capacity for storing a prescribed number of still images and a prescribed time's worth of moving images and audio.

In addition, the memory 32 also doubles as a memory (a video memory) for image display. Data for image display stored in the memory 32 can be output to an external display from the connecting I/F 25. By sequentially transferring VR images picked up by the imaging units 22a and 22b, generated by the image processing unit 24, and accumulated in the memory 32 to the external display and displaying the VR images on the external display, a function as an electronic view finder can be realized and live view display (LV display) can be performed. Hereinafter, an image displayed in a live view display will be referred to as a live view image (LV image). In addition, live view display (remote LV display) can also be performed by transferring VR images accumulated in the memory 32 to an external device (a smartphone or the like) wirelessly connected via a communicating unit 54 and having the external device display the VR images.

A nonvolatile memory 56 is a memory as an electrically erasable and recordable recording medium and is, for example, an EEPROM. Constants, a program, and the like necessary for operations of the system control unit 50 are recorded in the nonvolatile memory 56. In this case, the program refers to a computer program for executing various processes.

The system control unit 50 is a control unit constituted by at least one processor or one circuit and controls the entire digital camera 100. The system control unit 50 realizes the respective processes by executing the program recorded in the nonvolatile memory 56 described earlier. A system memory 52 is, for example, a RAM, and constants and variables necessary for operations of the system control unit 50, the program read from the nonvolatile memory 56, and the like are deployed onto the system memory 52. In addition, the system control unit 50 also performs display control by controlling the memory 32, the image processing unit 24, the memory control unit 15, and the like. A system timer 53 is a time-measuring unit for measuring time used in various controls and for measuring time according to an internal clock.

The mode changeover switch 60, the shutter button 61, the operating unit 70, and the power supply switch 72 are used in order to input various operation instructions to the system control unit 50.

The mode changeover switch 60 switches an operating mode of the system control unit 50 to any of a still image recording mode, a moving image photography mode, a playback mode, a communication connection mode, and the like. Modes included in the still image recording mode are an automatic photography mode, an automatic scene determination mode, a manual mode, an aperture priority mode (Av mode), a shutter speed priority mode (Tv mode), and a program AE mode. Other available modes include various scene modes that constitute photography settings for different photography scenes as well as custom modes. Using the mode changeover switch 60, the user can directly switch to any of these modes. Alternatively, after temporarily switching to a photography mode list screen using the mode changeover switch 60, another operating member may be used to selectively switch to any of a plurality of modes displayed on the display unit 28. In a similar manner, the moving image photography mode may also include a plurality of modes.

The shutter button 61 includes a first shutter switch 62 and a second shutter switch 64. The first shutter switch 62 is turned on during an operation of the shutter button 61 by a so-called half-press (a photography preparation instruction) and generates a first shutter switch signal SW1. In accordance with the first shutter switch signal SW1, the system control unit 50 starts a photography preparation operation involving an AF (automatic focusing) process, an AE (automatic exposure) process, an AWB (automatic white balance) process, an EF (preliminary light emission before flash) process, and the like. The second shutter switch 64 is turned on upon completion of an operation of the shutter button 61 by a so-called full-press (a photography instruction) and generates a second shutter switch signal SW2. In accordance with the second shutter switch signal SW2, the system control unit 50 starts a series of operations of a photography process from reading a signal from the imaging units 22a and 22b to writing image data into a recording medium 90.

It should be noted that the shutter button 61 is not limited to an operation member capable of operations in the two stages of a full depression and a half depression and may be an operation member only capable of a one-stage depression. In this case, a photography preparation operation and a photography process are successively performed by a one-stage depression. This is a same operation as a case where a shutter button that can be fully depressed and half-depressed is fully depressed (a case where the first shutter switch signal SW1 and the second shutter switch signal SW2 are generated approximately simultaneously).

By selecting and operating various function icons and options displayed on the display unit 28, the operating unit 70 is appropriately assigned a function for each scene and acts as various function buttons. Examples of the function buttons include an end button, a return button, an image feed button, a jump button, a narrow-down button, and an attribute change button. For example, when a menu button is pushed, a menu screen enabling various settings to be performed is displayed on the display unit 28. The user can intuitively perform various settings by operating the operating unit 70 while looking at the menu screen displayed on the display unit 28.

The power supply switch 72 is a push button for switching a power supply on and off. A power supply control unit 80 is constituted by a battery detection circuit, a DC-DC converter, a switching circuit for switching between blocks to be energized, and the like, and detects whether or not a battery is mounted, a type of the battery, a remaining battery level, and the like. In addition, the power supply control unit 80 controls the DC-DC converter on the basis of the detection results and an instruction from the system control unit 50 and supplies respective units including the recording medium 90 with necessary voltage for a necessary period of time. A power supply unit 30 is constituted by a primary battery such as an alkaline battery or a lithium battery, a secondary battery such as a NiCd battery, a NiMH battery, or a Li battery, an AC adapter, or the like.

A recording medium I/F 18 is an interface with the recording medium 90 that is a memory card, a hard disk, or the like. The recording medium 90 is a recording medium such as a memory card for recording photographed images and is constituted by a semiconductor memory, an optical disk, a magnetic disk, or the like. The recording medium 90 may be a replaceable recording medium that is mountable to and dismountable from the digital camera 100 or a recording medium that is built into the digital camera 100.

The communicating unit 54 transmits and receives video signals and audio signals to and from an external device connected wirelessly or by a wired cable. The communicating unit 54 is also capable of connecting to a wireless LAN (Local Area Network) and the Internet. The communicating unit 54 is capable of transmitting images (including LV images) picked up by the imaging units 22a and 22b and images recorded on the recording medium 90 and receiving images and various other types of information from the external device.

An attitude detecting unit 55 detects an attitude of the digital camera 100 relative to a direction of gravitational force. On the basis of the attitude detected by the attitude detecting unit 55, a determination can be made as to whether an image photographed by the imaging units 22a and 22b is an image photographed while holding the digital camera 100 horizontally or an image photographed while holding the digital camera 100 vertically. In addition, a determination can be made as to how much the digital camera 100 had been tilted in the three axial directions (rotation directions) of a yaw direction, a pitch direction, and a roll direction during photography of an image by the imaging units 22a and 22b. The system control unit 50 can add orientation information in accordance with the attitude detected by the attitude detecting unit 55 to an image file of a VR image picked up by the imaging units 22a and 22b and record the VR image after rotating the image (after adjusting an orientation of the VR image so as to perform tilt correction (zenith correction)). One of an acceleration sensor, a gyro sensor, a geomagnetic sensor, an orientation sensor, an altitude sensor, and the like or a combination of a plurality of these sensors can be used as the attitude detecting unit 55. A motion (panning, tilting, uplifting, whether stationary or not, or the like) of the digital camera 100 can also be detected using the acceleration sensor, the gyro sensor, the orientation sensor, or the like that constitutes the attitude detecting unit 55.

A microphone 20 is a microphone for collecting sound around the digital camera 100 to be recorded as audio of a VR image (a VR moving image) that is a moving image. The connecting I/F 25 is a connecting plug to which is connected an HDMI (registered trademark) cable, a USB cable, or the like to be connected to an external device to transmit and receive video.

Figure 2A:
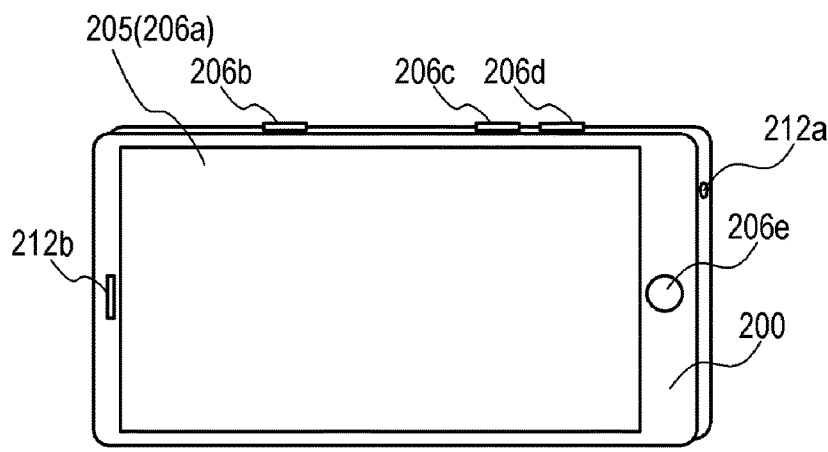
FIG. 2A is an external view of a display apparatus.

FIG. 2A is an external view diagram of an electronic device 200 according to the present embodiment. The electronic device 200 is a display apparatus such as a smartphone. A display 205 is a display unit which displays images and various types of information. The display 205 is integrally constructed with a touch panel 206a and is configured to be capable of detecting a touch operation on a display surface of the display 205. VR display of a VR image (a VR content) can be performed on the display 205. For example, a VR image picked up by the digital camera 100 described earlier can be acquired via a communication I/F 210 (to be described later) (a VR image transferred by wireless communication can be received) and recorded in a recording medium 208 (to be described later). VR display (display by VR viewing) of VR images recorded in the recording medium 208 in this manner can be performed on the display 205. Alternatively, VR display (display by VR viewing) can be performed on the display 205 by directly connecting the recording medium 90 on which a VR image picked up by the digital camera 100 is recorded to a recording medium I/F 207 (to be described later), reading the VR image from the recording medium 90, and playing back the read VR image. Alternatively, VR display can be performed by acquiring, via an SNS or the like, a VR image (a shared VR image) recorded on a server apparatus or the like connected to a network. An operating unit 206b is a power supply button for accepting an operation to switch between turning a power supply of the electronic device 200 on and off. An operating unit 206c and an operating unit 206d are volume buttons for increasing and reducing a volume of audio output from an audio output unit 212. An operating unit 206e is a home button for causing a home screen to be displayed on the display 205. An audio output terminal 212a is an earphone jack that is a terminal for outputting an audio signal to an earphone, an external speaker, or the like. A speaker 212b is a speaker built into a main body for outputting audio.

Figure 2B:
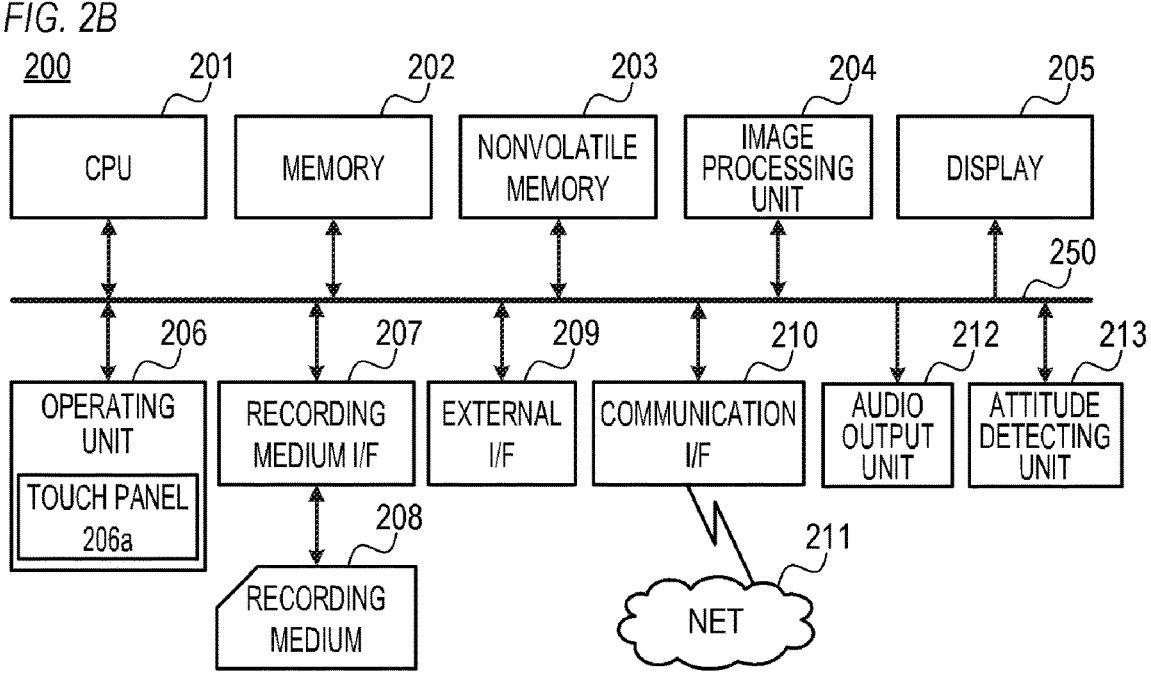
FIG. 2B is a block diagram of the display apparatus.

FIG. 2B is a block diagram showing a configuration example of the electronic device 200. A CPU 201, a memory 202, a nonvolatile memory 203, an image processing unit 204, the display 205, the operating unit 206, the recording medium I/F 207, an external I/F 209, and the communication I/F 210 are connected to an internal bus 250. In addition, the audio output unit 212 and an attitude detecting unit 213 are also connected to the internal bus 250. The respective units connected to the internal bus 250 are configured to be capable of exchanging data with one another via the internal bus 250.

The CPU 201 is a control unit which controls the entire electronic device 200 and is constituted by at least one processor or one circuit. The memory 202 is constituted by, for example, a RAM (such as a volatile memory using a semiconductor element). The CPU 201 controls the respective units of the electronic device 200 by, for example, using the memory 202 as a work memory in accordance with a program stored in the nonvolatile memory 203. The nonvolatile memory 203 stores image data and audio data, other data, various programs that enable the CPU 201 to operate, and the like. The nonvolatile memory 203 is constituted by, for example, a flash memory or a ROM.

Under control by the CPU 201, the image processing unit 204 performs various image processing on images stored in the nonvolatile memory 203 or the recording medium 208, video signals acquired via the external I/F 209, images acquired via the communication I/F 210, and the like. Image processing performed by the image processing unit 204 includes an A/D conversion process and a D/A conversion process as well as an encoding process, a compression process, a decoding process, an enlargement/reduction process (resizing), a noise reduction process, a color conversion process, and the like of image data. The image processing unit 204 also performs various image processing such as panoramic development, a mapping process, and conversion of omnidirectional images or VR images being wide-range images having video of a wide range if not omnidirectional. The image processing unit 204 may be constituted by a dedicated circuit block for performing specific image processing. In addition, depending on a type of image processing, the CPU 201 may perform the image processing in accordance with a program without using the image processing unit 204.

The display 205 displays images, a GUI (Graphical User Interface) screen constituting a GUI, and the like under control by the CPU 201. The CPU 201 controls the respective units of the electronic device 200 so as to generate a display control signal in accordance with the program and to generate a video signal to be displayed on the display 205 and output the video signal to the display 205. The display 205 displays a video on the basis of generated and output video signals. Alternatively, components of the electronic device 200 itself may be limited to up to an interface for outputting a video signal to be displayed by the display 205, and the display 205 may be constituted by an external monitor (such as a television or an HMD).

The operating unit 206 is an input device for accepting a user operation of which examples include a character information input device such as a keyboard, a pointing device such as a mouse or a touch panel, a button, a dial, a joystick, a touch sensor, and a touch pad. In the present embodiment, the operating unit 206 includes the touch panel 206a and the operating units 206b, 206c, 206d, and 206e.

The recording medium 208 that is a memory card, a CD, a DVD, or the like is mountable to and dismountable from the recording medium I/F 207. Under control by the CPU 201, the recording medium I/F 207 reads data from the mounted recording medium 208 and writes data to the mounted recording medium 208. The external I/F 209 is an interface to be connected to an external device using a wired cable or in a wireless manner to perform input and output of video signals and audio signals. The communication I/F 210 is an interface for communicating with an external device, the Internet 211, and the like to transmit and receive various types of data such as files and commands.

The audio output unit 212 outputs audio of moving images and music data, keyboard clicks, ring tones, various notification sounds, and the like. While it is assumed that the audio output unit 212 includes an audio output terminal 212a to which an earphone or the like is to be connected and a speaker 212b, alternatively, the audio output unit 212 may output audio data to an external speaker by radio communication or the like.

The attitude detecting unit 213 detects an attitude (a tilt) of the electronic device 200 relative to a direction of gravitational force or an attitude of the electronic device 200 with respect to the respective axes in the yaw direction, the pitch direction, and the roll direction. On the basis of an attitude detected by the attitude detecting unit 213, a determination can be made as to whether the electronic device 200 is being held horizontally, held vertically, pointed upward, pointed downward, or assuming an oblique attitude. In addition, a determination can be made as to a presence or absence or a magnitude of a tilt of the electronic device 200 in a rotation direction such as the yaw direction, the pitch direction, or the roll direction and whether or not the electronic device 200 has rotated in the rotation direction. One of an acceleration sensor, a gyro sensor, a geomagnetic sensor, an orientation sensor, an altitude sensor, and the like or a combination of a plurality of these sensors can be used as the attitude detecting unit 213.

As described above, the operating unit 206 includes the touch panel 206a. The touch panel 206a is an input device which is planarly configured so as to overlap with the display 205 and to output coordinate information in accordance with a touched position. The CPU 201 is capable of detecting the following operations with respect to the touch panel 206a or the following states of the touch panel 206a.

A state where a finger or a stylus previously not in touch with the touch panel 206a newly touches the touch panel 206a or, in other words, a start of a touch (hereinafter referred to as a touch-down)

A state where the touch panel 206a is being touched by a finger or a stylus (hereinafter referred to as a touch-on)

A state where a finger or a stylus is moving while in touch with the touch panel 206a (hereinafter referred to as a touch-move)

A state where a finger or a stylus previously in touch with the touch panel 206a separates from the touch panel 206a or, in other words, an end of a touch (hereinafter referred to as a touch-up)

A state where nothing is touching the touch panel 206a (hereinafter referred to as a touch-off)

When a touch-down is detected, a touch-on is simultaneously detected. Normally, after a touch-down, a touch-on is continuously detected unless a touch-up is detected. When a touch-move is detected, a touch-on is similarly simultaneously detected. Even when a touch-on is detected, a touch-move is not detected unless a touch position moves. A touch-off is detected upon detection of a touch-up of all of the fingers or a stylus previously in touch.

The CPU 201 is notified of the operations or the states described above as well as position coordinates where a finger or a stylus touches the touch panel 206a through an internal bus and, on the basis of the notified information, the CPU 201 determines what kind of operation (touch operation) has been performed on the touch panel 206a. With respect to a touch-move, a movement direction of a finger or a stylus moving on the touch panel 206a can be determined for each of a vertical component and a horizontal component on the touch panel 206a on the basis of a change in the position coordinates. When a touch-move of a prescribed distance or more is detected, it is determined that a slide operation has been performed.

An operation involving quickly moving a finger on the touch panel 206a for a certain distance while keeping the finger in touch with the touch panel 206a and then releasing the finger is referred to as a flick. In other words, a flick is an operation in which a finger quickly traces the touch panel 206a as though flicking on the touch panel 206a. A determination that a flick has been performed can be made (a determination that a flick has occurred following a slide operation can be made) when a detection of a touch-move of a prescribed distance or more at a prescribed speed or more is followed by a detection of a touch-up.

Furthermore, a touch operation involving touching a plurality of locations (for example, two points) at the same time and bringing the respective touch positions close to each other is referred to as a pinch-in while a touch operation in which the respective touch positions are distanced from each other is referred to as a pinch-out. A pinch-out and a pinch-in are collectively referred to as a pinch operation (or, simply, a pinch). As the touch panel 206a, a touch panel adopting any of various systems including a resistive film system, a capacitance system, a surface acoustic wave system, an infrared system, an electromagnetic induction system, an image recognition system, and an optical sensor system may be used. Any of a system in which a touch is detected when contact is made with the touch panel and a system in which a touch is detected when a finger or a stylus approaches the touch panel may be adopted.

Figure 2C:
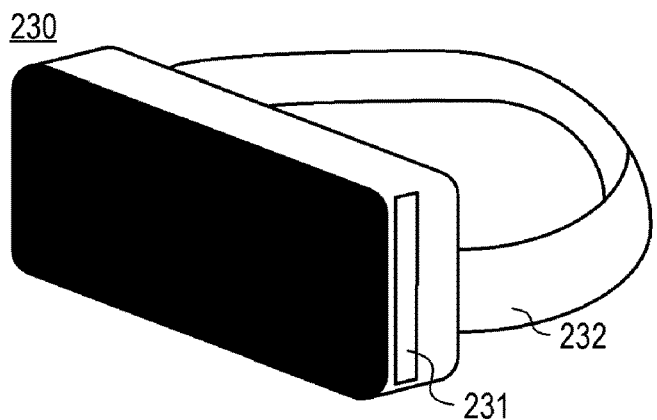
FIG. 2C is an external view of VR goggles.

FIG. 2C is an external view of VR goggles (a head mount adapter) 230 to which the electronic device 200 is mountable. By mounting the electronic device 200 to the VR goggles 230, the electronic device 200 can also be used as a head mounted display. An insertion opening 231 is an insertion opening to which the electronic device 200 is to be inserted. The entire electronic device 200 can be inserted into the VR goggles 230 by orienting the display surface of the display 205 toward a side of a headband 232 for fixing the VR goggles 230 to the head of the user (in other words, toward the user). In a state where the VR goggles 230 to which the electronic device 200 has been mounted are worn on the user's head, the user can view the display 205 of the electronic device 200 without having to manually hold the electronic device 200. In this case, when the user moves his or her head or entire body, an attitude of the electronic device 200 also changes. The attitude detecting unit 213 detects an attitude change of the electronic device 200 at this point, and the CPU 201 performs a process for VR display on the basis of the attitude change. In this case, the detection of the attitude of the electronic device 200 by the attitude detecting unit 213 is equivalent to a detection of an attitude of the head of the user (a direction in which a line of sight of the user is oriented). Alternatively, the electronic device 200 itself may be an HMD that is mountable to the head even without VR goggles.

Figure 3:
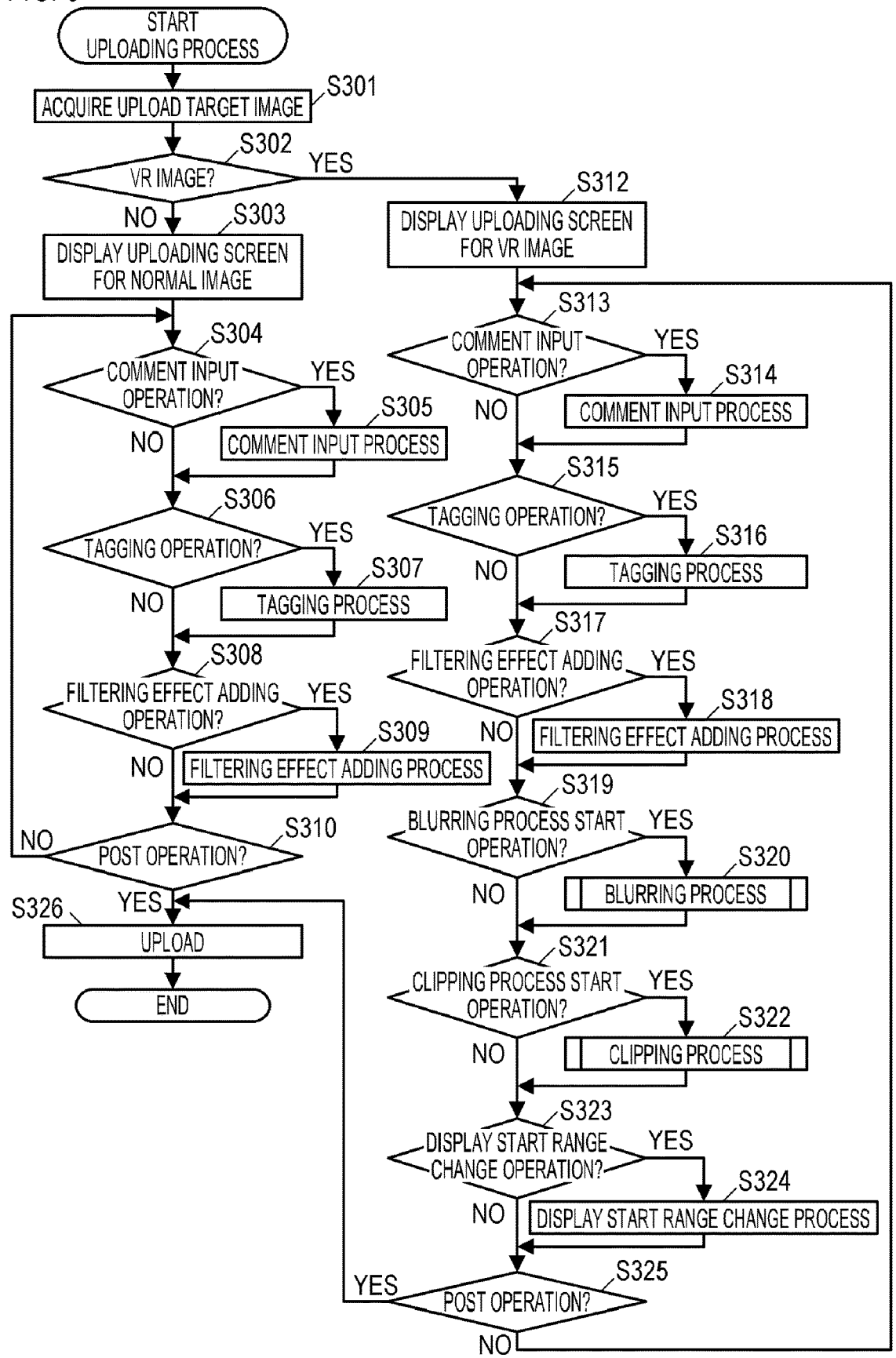
FIG. 3 is a flow chart of a posting process (an uploading process)

FIG. 3 is a flow chart showing an example of a posting process (an uploading process of uploading (posting; contributing) an image on an SNS (social networking service) site) by the electronic device 200. This process is realized as the CPU 201 deploys a program recorded in the nonvolatile memory 203 on the memory 202 and executes the program. The process shown in FIG. 3 starts once power of the electronic device 200 is turned on and display on the display 205 becomes possible. For example, image viewing application software that enables normal images and VR images to be viewed, file management application software, or the like among a plurality of application software installed on the electronic device 200 is used to select an image that the user wishes to upload. Subsequently, when the user issues an upload instruction (a "share" instruction), the process shown in FIG. 3 is started. Specifically, when an image to be uploaded is selected and a specific SNS site is selected as an upload destination, application software of the specific SNS site is notified of information specifying the selected image and the application software of the specific SNS site is started. In addition, the process shown in FIG. 3 is started as a function of the application software of the specific SNS site. Alternatively, the electronic device 200 may start the process shown in FIG. 3 in response to a user operation of displaying a post creation screen for selecting and posting an image and selecting an image to be posted performed in a state where the application software of the specific SNS site is running. The user selects the image to be posted from a plurality of images recorded on the electronic device 200 (the nonvolatile memory 203 or the recording medium 208) or a plurality of undisclosed (unshared) images stored in a server capable of communicating with the electronic device 200 via the communication I/F 210.

In S301, the CPU 201 acquires (reads) an image (an upload target image, an upload candidate image) selected in advance by the user from any of the nonvolatile memory 203, the recording medium 208, and a server capable of communicating with the electronic device 200 via the communication I/F 210. The CPU 201 stores the acquired upload target image in the memory 202.

In S302, on the basis of attribute information of the upload target image, the CPU 201 determines whether the upload target image is a normal image for performing normal display (display of entire image which is not VR display) or a VR image for performing VR display. As the attribute information, for example, at least any of metadata stored in a header of a file of the upload target image, a file name of the file, an extension of the file, and a file path of the file is used. When the CPU 201 determines that the upload target image is a normal image (when the CPU 201 determines that the upload target image is not a VR image), the step advances to S303, but otherwise (when the CPU 201 determines that the upload target image is a VR image) the step advances to S312.

It should be noted that, on an SNS site, a normal image may always be subjected to normal display and a VR image may always be subjected to VR display. Therefore, a normal image can also be described as "an image to be subjected to normal display" and a VR image can also be described as "an image to be subjected to VR display". In addition, there may be cases where normal display and VR display can be interchangeably executed with respect to a VR image but only normal display can be executed (VR display cannot be executed) with respect to a normal image. Therefore, a normal image can also be described as "an image of which VR display cannot be performed" and a VR image can also be described as "an image of which VR display can be performed".

In S303, the CPU 201 displays an uploading screen (a post creation screen) for a normal image on the display 205.

FIG. 6A shows an example of an uploading screen for a normal image. The uploading screen for a normal image displays a comment input field 601, a preview region 602, a post icon 603, a tagging icon 604, and a filtering effect adding icon 605.

The comment input field 601 is a display item for inputting a comment to be uploaded (posted) in association with an upload target image. When the user touches the comment input field 601, a software keyboard is displayed and input of a comment is enabled.

In the preview region 602, preview display of the upload target image is performed. The CPU 201 displays the entire upload target image in the preview region 602 of the uploading screen for a normal image. The CPU 201 may display the upload target image (an original image) in a reduced size or may display a thumbnail image associated with the upload target image.

The post icon 603 is a display item for uploading (posting) the upload target image. When the user touches the post icon 603, the upload target image is uploaded and shared in a state designated on the uploading screen. For example, when a comment has been input, the upload target image and the comment are uploaded and shared.

The tagging icon 604 is a display item for tagging the upload target image. When the upload target image is uploaded (posted), the upload target image is shared and becomes viewable within a disclosure range (a range in which the image is to be disclosed) set by the user of the electronic device 200. When the user touches the tagging icon 604 and issues an instruction to tag a friend on an SNS site or the like, the upload target image is shared and becomes viewable within a disclosure range of a tagged user in addition to the disclosure range of the user of the electronic device 200.

The filtering effect adding icon 605 is a display item for adding a special effect (a filtering effect) related to at least one of image brightness and image color with respect to the upload target image. When the user touches the filtering effect adding icon 605 and issues an instruction to select any of a plurality of filtering effects, the selected filtering effect is added to the upload target image (image processing corresponding to the filtering effect is performed on the upload target image). Examples of the filtering effect include conversion to a monochromatic image, sepia toning, enhancement of warm colors, enhancement of cold colors, and reduction of peripheral illumination (brightness).

Let us now return to the description of FIG. 3. In S304, the CPU 201 determines whether or not a user operation (a comment input operation) involving touching the comment input field 601 and inputting a comment has been performed. When the CPU 201 determines that a comment input operation has been performed, the step advances to S305, but otherwise the step advances to S306. In S305, the CPU 201 acquires a comment in accordance with the comment input operation and stores the acquired comment in the memory 202 (a comment input process).

In S306, the CPU 201 determines whether or not a user operation (a tagging operation) involving touching the tagging icon 604 and performing tagging has been performed. When the CPU 201 determines that a tagging operation has been performed, the step advances to S307, but otherwise the step advances to S308. In S307, in accordance with the tagging operation, the CPU 201 tags the upload target image stored in the memory 202 (a tagging process).

In S308, the CPU 201 determines whether or not a user operation (a filtering effect adding operation) involving touching the filtering effect adding icon 605 and adding a filtering effect has been performed. When the CPU 201 determines that a filtering effect adding operation has been performed, the step advances to S309, but otherwise the step advances to S310. In S309, in accordance with the filtering effect adding operation, the CPU 201 adds a filtering effect to the upload target image stored in the memory 202 (a filtering effect adding process).

In S310, the CPU 201 determines whether or not a user operation (a post operation) for posting the upload target image stored in the memory 202 or, more specifically, a touch operation involving touching the post icon 603 has been performed. When the CPU 201 determines that a post operation has been performed, the step advances to S326, but otherwise the step advances to S304.

In S312 in a case where the upload target image is a VR image, the CPU 201 displays an uploading screen (a post creation screen) for a VR image on the display 205.

FIG. 6B shows an example of the uploading screen for a VR image. In a similar manner to the uploading screen for a normal image, the uploading screen for a VR image displays the comment input field 601, the preview region 602, the post icon 603, the tagging icon 604, and the filtering effect adding icon 605. The uploading screen for a VR image further displays a blurring icon 606 and a clipping icon 607. The blurring icon 606 and the clipping icon 607 are specific display items for performing a hiding process of hiding (concealing) a part of an image.

In the preview region 602 of the uploading screen for a VR image, preview display of the upload target image is performed in a similar manner to the uploading screen for a normal image. However, unlike the uploading screen for a normal image, the CPU 201 displays a part of an upload target image as a display range in the preview region 602 of the uploading screen for a VR image. In addition, the CPU 201 changes the display range that is displayed in the preview region 602 in accordance with a user operation (a touch-move with respect to the preview region 602, an attitude change of the electronic device 200, or the like). In other words, VR display (display by VR viewing) of the upload target image is performed in the preview region 602 of the uploading screen for a VR image.

The blurring icon 606 is a display item for performing a blurring process in which a part (a hide target) of an image is designated and blurred. When the user touches the blurring icon 606, the blurring process is started (a transition is made to an operating mode for performing the blurring process). In the blurring process, the user can select an object (a hide target) to be blurred from the upload target image while changing the display range of the upload target image by a touch-move, an attitude change, or the like (in other words, while performing VR viewing). Details of the blurring process will be described later.

The clipping icon 607 is a display item for performing a clipping process of discarding a part (a hide range) of an image. When the user touches the clipping icon 607, the clipping process is started (a transition is made to an operating mode for performing the clipping process). In the clipping process, the user can select a range to be clipped (a range to be retained) from the upload target image while changing the display range of the upload target image by a touch-move, an attitude change, or the like (in other words, while looking at a VR view). It should be noted that, even after the part is discarded, the upload target image can be viewed in a VR view. In other words, a VR image after discarding a part thereof is also a VR image, albeit with a reduced range. In a VR view, the discarded range appears as a non-video region such as a blacked-out region. Details of the clipping process will be described later.

Since only a part of the upload target image is displayed in the preview region 602 of the uploading screen for a VR image, there is a risk that the user is unaware of the presence of an object to be hidden in a range not being displayed (a range not visible). In the present embodiment, displaying the blurring icon 606 and the clipping icon 607 enables the user to be prompted to check whether or not an object to be hidden is present in a range not visible.

It should be noted that processes other than the blurring process and the clipping process can be made executable as the hiding process. For example, as the hiding process, a masking process of designating a part of an image and covering the designated part with a prescribed mask image or a mosaicking process of designating a part of an image and mosaicking the designated part may be performed.

Let us now return to the description of FIG. 3. In S313, the CPU 201 determines whether or not a comment input operation has been performed in a similar manner to S304. When the CPU 201 determines that a comment input operation has been performed, the step advances to S314, but otherwise the step advances to S315. In S314, the CPU 201 performs the comment input process in a similar manner to S305.

In S315, the CPU 201 determines whether or not a tagging operation has been performed in a similar manner to S306. When the CPU 201 determines that a tagging operation has been performed, the step advances to S316, but otherwise the step advances to S317. In S316, the CPU 201 performs the tagging process in a similar manner to S307.

In S317, the CPU 201 determines whether or not a filtering effect adding operation has been performed in a similar manner to S308. When the CPU 201 determines that a filtering effect adding operation has been performed, the step advances to S318, but otherwise the step advances to S319. In S318, the CPU 201 performs the filtering effect adding process in a similar manner to S309.

In S319, the CPU 201 determines whether or not a user operation (a blurring process start operation) for starting the blurring process or, more specifically, a touch operation involving touching the blurring icon 606 has been performed. When the CPU 201 determines that a blurring process start operation has been performed, the step advances to S320, but otherwise the step advances to S321. In S320, the CPU 201 performs the blurring process. Details of the blurring process will be described later.

In S321, the CPU 201 determines whether or not a user operation (a clipping process start operation) for starting the clipping process or, more specifically, a touch operation involving touching the clipping icon 607 has been performed. When the CPU 201 determines that a clipping process start operation has been performed, the step advances to S322, but otherwise the step advances to S323. In S322, the CPU 201 performs the clipping process. Details of the clipping process will be described later.

In S323, the CPU 201 determines whether or not a user operation (a display start range change operation) for changing an initial range of a display range (a display start range) when each user views the uploaded and shared upload target image in a VR view has been performed. For example, when uploading the upload target image, the CPU 201 sets a display range being displayed in the preview region 602 of the uploading screen as a display start range. Therefore, the display start range change operation can be described as a user operation (a display range change operation) for changing the display range. When the CPU 201 determines that a display start range change operation has been performed, the step advances to S324, but otherwise the step advances to S325. In S324, the CPU 201 changes the display start range in accordance with the display start range change operation (a display start range change process).

In S325, the CPU 201 determines whether or not a post operation has been performed in a similar manner to S310. When the CPU 201 determines that a post operation has been performed, the step advances to S326, but otherwise the step advances to S313.

In S326, the CPU 201 uploads (posts) the upload target image on an SNS site in a state designated on the uploading screen. Specifically, the state designated on the uploading screen includes the presence or absence of an association with a comment, the presence or absence of tagging, enabling or disabling a filtering effect, enabling or disabling the blurring process, enabling or disabling the clipping process, and a display start range. By being uploaded (posted) on the SNS site, the upload target image or the like is stored in a server of the SNS site and displayed on a screen of the SNS site. When a VR image is uploaded, the VR image is also displayed in a VR view on the screen of the SNS site. In other words, a range of a part of the posted VR image is displayed, and the display range is changed in accordance with a display range change operation by the user or an attitude change of a device used to view the SNS site.

While the act of uploading an image to an SNS site is referred to as "posting" in the present embodiment, an image need only become viewable by a plurality of users by being posted. For this reason, the act of changing a disclosure setting (privacy setting) of an image after being uploaded from "nondisclosure (a setting that prevents the image from being disclosed to other users, e.g. Private, Only me)" to "disclosure (a setting that allows the image to be disclosed to other users, e.g. Public, Friends of friends Only)" may be referred to as "posting".

In addition, while the electronic device 200 performs a hiding process (the blurring process in S320 or the clipping process in S322) and uploads an VR image (an upload target image) after the hiding process (S326) in the present embodiment, the electronic device 200 is not limited thereto. The electronic device 200 may upload the VR image (a VR image prior to a hiding process) acquired in S301. Subsequently, an external device (such as a server of an SNS site) which discloses the posted image may perform a hiding process in accordance with a user operation with respect to the electronic device 200 or the like.

Furthermore, while the blurring icon 606 and the clipping icon 607 are always displayed on the uploading screen for a VR image in the present embodiment, this configuration is not restrictive. For example, in at least any of cases 1 to 4 described below, image quality deterioration due to an unnecessary hiding process can be suppressed by not displaying the blurring icon 606 and the clipping icon 607.

Case 1: When a face is not included in the acquired VR image: Since a hide target is often a face, it is likely that a hiding process is not required when the acquired VR image does not include a face.

Case 2: When the number of faces included in the acquired VR image is equal to or smaller than a threshold number (for example, equal to or smaller than 2): When the number of faces included in the acquired VR image is small, it is likely that the faces belong to the user of the electronic device 200 and to acquaintances of the user, and a hiding process is not required when the VR image is shared among such acquaintances.

Case 3: When a size of a face included in the acquired VR image is equal to or smaller than a threshold size (for example, equal to or smaller than 120×120 pixels): When the size of a face included in the acquired VR image is small, since a person is less likely to be recognized from the face, it is likely that a hiding process is not required.

Case 4: When a privacy setting of the candidate image meets a predetermines criteria, such as when a disclosure range (a range disclosed after posting) of the acquired VR image is equal to or smaller than a threshold range: For example, the blurring icon 606 and the clipping icon 607 are displayed when the disclosure extends to people who are not SNS users, when the disclosure extends to friends of friends, or when the disclosure extends to friends. On the other hand, when the disclosure is limited to the user himself/herself, when the disclosure is limited to certain friends, and the like, the blurring icon 606 and the clipping icon 607 are not displayed. When the disclosure range is narrow (when a disclosure destination level is low), since only a very limited number of users are able to view the VR image, it is likely that a hiding process is not required.

Figure 4:
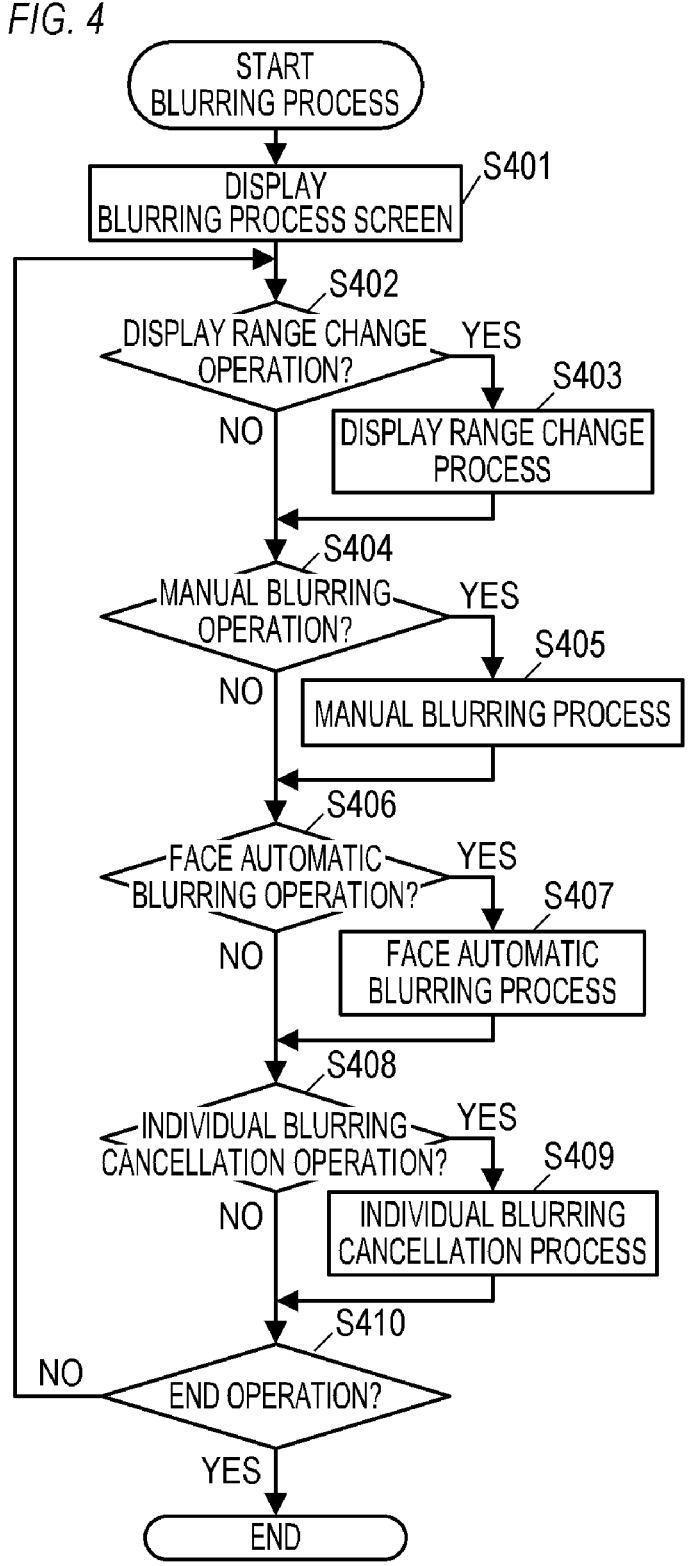
FIG. 4 is a flow chart of a blurring process.

FIG. 4 is a flow chart showing an example of the blurring process (S320 in FIG. 3) of the electronic device 200. This process is realized as the CPU 201 deploys a program recorded in the nonvolatile memory 203 on the memory 202 and executes the program.

In S401, the CPU 201 displays a blurring process screen on the display 205 (causes a transition of the display screen of the display 205 from the uploading screen to the blurring process screen).

Figure 7A:
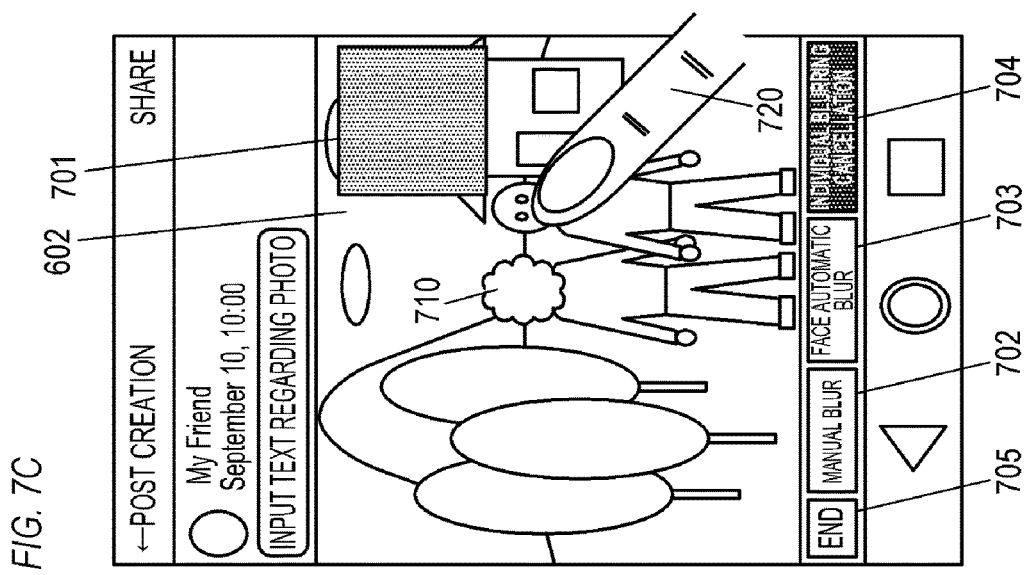
FIGS. 7A to 7C show examples of a blurring process screen.
Figure 7B:
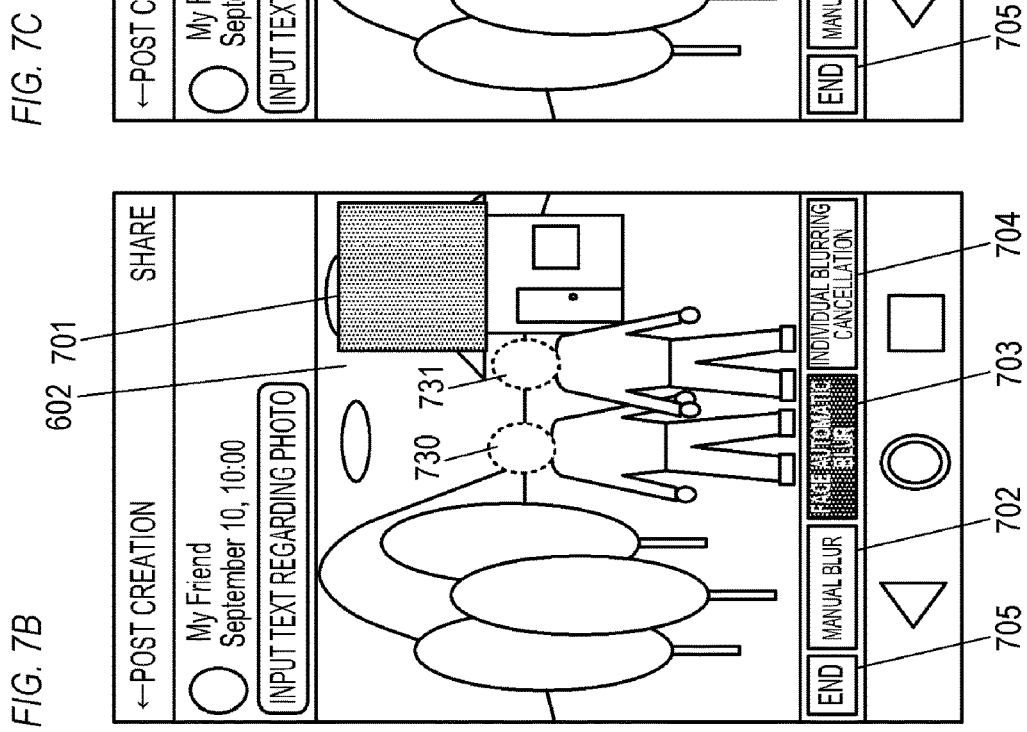
Figure 7C:
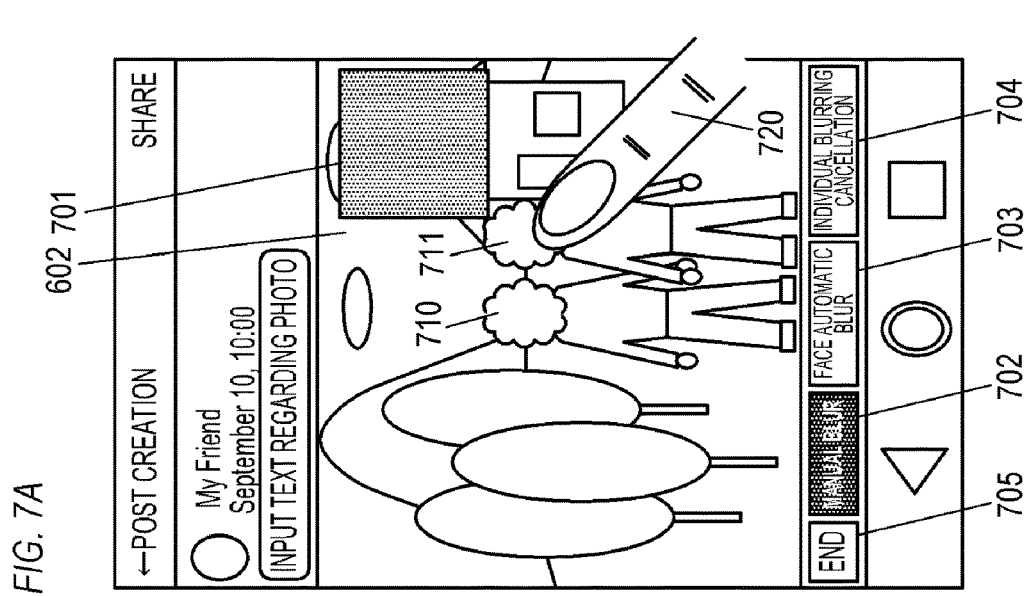

FIGS. 7A to 7C show examples of a blurring process screen. The blurring process screen displays the preview region 602, a display range change region 701, a manual blurring icon 702, a face automatic blurring icon 703, an individual blurring cancellation icon 704, and an end icon 705.

In the preview region 602 of the blurring process screen, preview display with a part of the upload target image as a display range is performed in a similar manner to the uploading screen for a VR image. However, since the blurring process is configured to be performed in accordance with a touch-move with respect to the preview region 602, it is assumed that the display range is not changed in accordance with a touch-move with respect to the preview region. In addition, it is also assumed that the display range is not changed in accordance with an attitude change of the electronic device 200.

The display range change region 701 is a region (a display item) for changing the display range to be displayed in the preview region 602. When the user performs a touch-move with respect to the display range change region 701, the display range to be displayed in the preview region 602 is changed. Since the display range can be changed by a touch-move with respect to the display range change region 701, the user can select an object to be blurred from the upload target image while changing the display range of the upload target image. It should be noted that, in the display range change region 701, an entire range of the upload target image and the display range may be identifiably displayed or a reduction of the display in the preview region 602 may be displayed. Moreover, a method of changing the display range is not particularly limited. For example, the display range can be made changeable in accordance with a touch-move with respect to the preview region 602, an attitude change of the electronic device 200, and the like in a state where the manual blurring icon 702, the face automatic blurring icon 703, the individual blurring cancellation icon 704, and the like are disabled.

The manual blurring icon 702 is a display item for manually designating and blurring a part of an image. When the user enables the manual blurring icon 702 by touching the manual blurring icon 702 and touches the upload target image displayed in the preview region 602, the touched location in the upload target image is blurred. In FIG. 7A, the manual blurring icon 702 is enabled and regions 710 and 711 are touched by a finger 720 and are blurred.

The face automatic blurring icon 703 is a display item for automatically blurring a region of a face (a facial region). When the user enables the face automatic blurring icon 703 by touching the face automatic blurring icon 703, a facial region is detected from the upload target image and the detected facial region is blurred. In FIG. 7B, the face automatic blurring icon 703 is enabled and facial regions 730 and 731 are blurred automatically (without being touched). A facial region may be detected from an entire range of the upload target image or may be only detected from the display range.

The individual blurring cancellation icon 704 is a display item for individually designating a blurred region (a region having been blurred) and canceling the blurring. When the user enables the individual blurring cancellation icon 704 by touching the individual blurring cancellation icon 704 and touches a blurred region in the upload target image displayed in the preview region 602, blurring of the touched blurred region is canceled. In FIG. 7C, the individual blurring cancellation icon 704 is enabled, the region 711 shown in FIG. 7A is touched by the finger 720, and blurring of the region 711 has been canceled.

The end icon 705 is a display item for ending the blurring process. When the user touches the end icon 705, the blurring process is ended.

Let us now return to the description of FIG. 4. In S402, the CPU 201 determines whether or not a user operation (a display range change operation) for changing the display range of the upload target image or, more specifically, a touch-move with respect to the display range change region 701 has been performed. When the CPU 201 determines that a display range change operation has been performed, the step advances to S403, but otherwise the step advances to S404. In S403, the CPU 201 changes the display range in accordance with the display range change operation (a display range change process).

In S404, the CPU 201 determines whether or not a user operation (a manual blurring operation) involving touching and enabling the manual blurring icon 702 and touching the upload target image displayed in the preview region 602 has been performed. When the CPU 201 determines that a manual blurring operation has been performed, the step advances to S405, but otherwise the step advances to S406. In S405, the CPU 201 blurs a touched location in the upload target image (a manual blurring process).

In S406, the CPU 201 determines whether or not a user operation (a face automatic blurring operation) involving touching and enabling the face automatic blurring icon 703 has been performed. When the CPU 201 determines that a face automatic blurring operation has been performed, the step advances to S407, but otherwise the step advances to S408. In S407, the CPU 201 detects a facial region from the upload target image and blurs the detected facial region (a face automatic blurring process).

In S408, the CPU 201 determines whether or not a user operation (an individual blurring cancellation operation) involving touching and enabling the individual blurring cancellation icon 704 and touching a blurred region of the upload target image displayed in the preview region 602 has been performed. When the CPU 201 determines that an individual blurring cancellation operation has been performed, the step advances to S409, but otherwise the step advances to S410. In S409, the CPU 201 cancels blurring of the touched blurred region (an individual blurring cancellation process).

In S410, the CPU 201 determines whether or not a user operation (an end operation) for ending the blurring process or, more specifically, a touch operation involving touching the end icon 705 has been performed. When the CPU 201 determines that an end operation has been performed, the blurring process is terminated and the display screen of the display 205 is changed from the blurring process screen to the uploading screen. Otherwise, the step advances to S402. It should be noted that when the post icon is also displayed on the blurring process screens shown in FIGS. 7A to 7C and the post icon is touched (when a post operation is performed), a VR image having been subjected to a blurring process on the blurring process screen may be uploaded (posted) without making a transition to the uploading screen.

Figure 5:
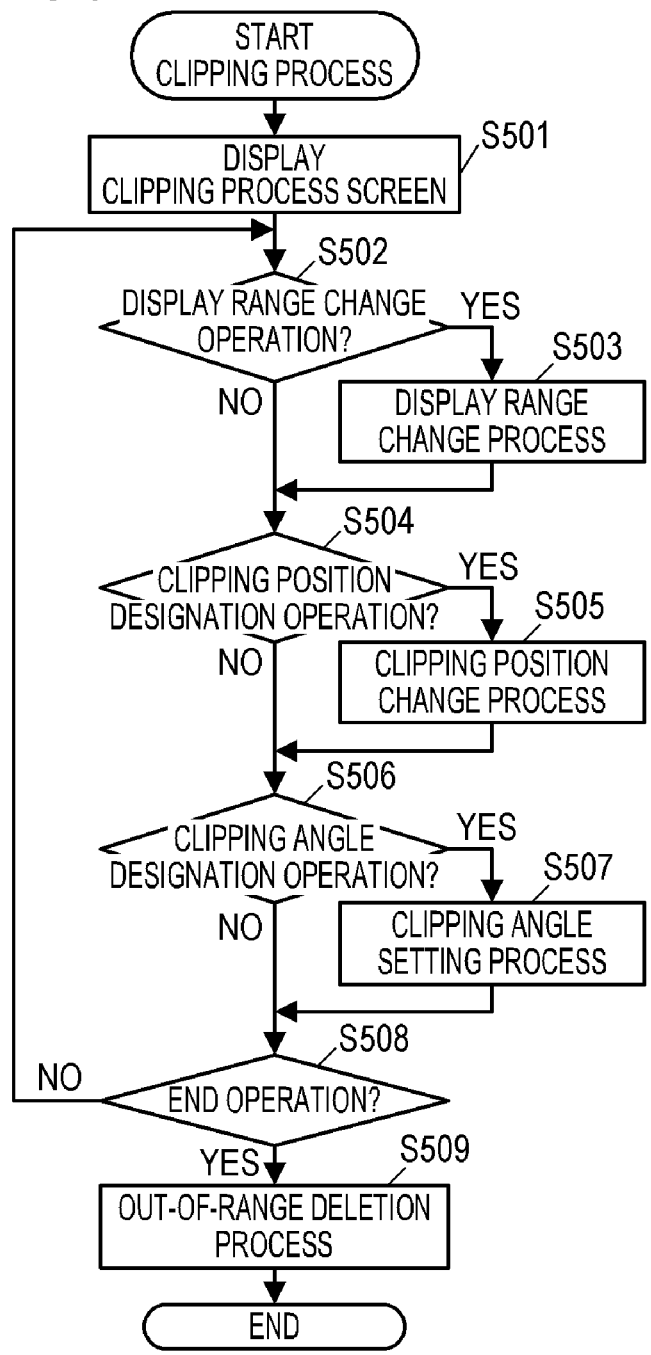
FIG. 5 is a flow chart of a clipping process.

FIG. 5 is a flow chart showing an example of the clipping process (S322 in FIG. 3) of the electronic device 200. This process is realized as the CPU 201 deploys a program recorded in the nonvolatile memory 203 on the memory 202 and executes the program.

In S501, the CPU 201 displays a clipping process screen on the display 205 (causes a transition of the display screen of the display 205 from the uploading screen to the clipping process screen).

Figure 8:
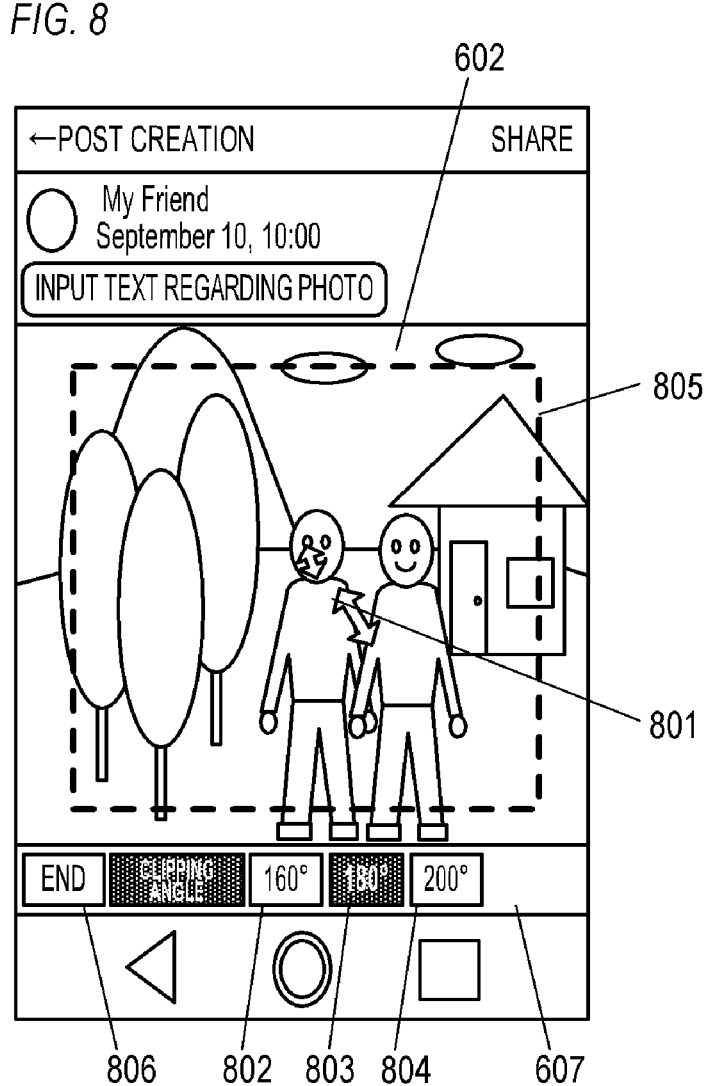
FIG. 8 shows an example of a clipping process screen.

FIG. 8 shows an example of a clipping process screen. The clipping process screen displays the preview region 602, a clipping position icon 801, clipping angle icons 802 to 804, a clipping range line 805, and an end icon 806.

In the preview region 602, preview display with a part of the upload target image as a display range is performed in a similar manner to the uploading screen for a VR image. In addition, the display range that is displayed in the preview region 602 is changed in accordance with a user operation (a touch-move with respect to the preview region 602, an attitude change of the electronic device 200, or the like). Therefore, the user can select a range to be clipped (a range to be retained, a clipping range) from the upload target image while changing the display range of the upload target image by a touch-move, an attitude change, or the like.

The clipping position icon 801 is a display icon indicating a center position (a clipping position) of a clipping range. When the user performs a long touch (a touch of a prescribed time or more) with respect to the upload target image displayed in the preview region 602, the clipping position is changed to a position at which the long touch has been performed. An initial position of the clipping position is, for example, a center of the display range at the start of the clipping process or the like.

The clipping angle icons 802 to 804 are display items for designating an angle (a clipping angle) of the clipping range. When the user touches the clipping angle icon 802, 160 degrees is set as the clipping angle and a range of 80 vertical and horizontal degrees centered on the set clipping position is set as the clipping range. When the user touches the clipping angle icon 803, 180 degrees is set as the clipping angle and a range of 90 vertical and horizontal degrees centered on the set clipping position is set as the clipping range. When the user touches the clipping angle icon 804, 200 degrees is set as the clipping angle and a range of 100 vertical and horizontal degrees centered on the set clipping position is set as the clipping range.

After designating a position of the clipping range by a long touch with respect to the upload target image, the user can designate an angle of the clipping range by a touch with respect to any of the clipping angle icons 802 to 804. In addition, after designating the angle of the clipping range by a touch with respect to any of the clipping angle icons 802 to 804, the user can designate the position of the clipping range by a long touch with respect to the upload target image. Alternatively, a configuration may be adopted in which an arbitrary range can be designated as the clipping range by a touch operation or the like with respect to the preview region 602. The user may be capable of designating a hide range (a range to be discarded) instead of a clipping range (a range to be retained).

The clipping range line 805 is a display item indicating the clipping range and indicates a contour of the clipping range by a dash line or the like.

The end icon 806 is a display item for ending the clipping process. When the user touches the end icon 806, the clipping process is ended.

Let us now return to the description of FIG. 5. In S502, the CPU 201 determines whether or not a user operation (a display range change operation) for changing the display range of the upload target image or, more specifically, a touch-move with respect to the preview region 602, an attitude change of the electronic device 200, or the like has been performed. When the CPU 201 determines that a display range change operation has been performed, the step advances to S503, but otherwise the step advances to S504. In S503, the CPU 201 changes the display range in accordance with the display range change operation (a display range change process).

In S504, the CPU 201 determines whether or not a user operation (a clipping position designation operation) for designating a clipping position or, more specifically, a long touch with respect to the upload target image displayed in the preview region 602 has been performed. When the CPU 201 determines that a clipping position designation operation has been performed, the step advances to S505, but otherwise the step advances to S506. In S505, the CPU 201 changes the clipping position to the position (the position at which the long touch is performed) designated by the clipping position designation operation (a clipping position change process).

In S506, the CPU 201 determines whether or not a user operation (a clipping angle designation operation) for designating a clipping angle or, more specifically, a touch with respect to any of the clipping angle icons 802 to 804 has been performed. When the CPU 201 determines that a clipping angle designation operation has been performed, the step advances to S507, but otherwise the step advances to S508. In S507, the CPU 201 sets the angle designated by the clipping angle designation operation as the clipping angle (a clipping angle setting process).

In S508, the CPU 201 determines whether or not a user operation (an end operation) for ending the clipping process or, more specifically, a touch operation involving touching the end icon 806 has been performed. When the CPU 201 determines that an end operation has been performed, the step advances to S509, but otherwise the step advances to S502.

In S509, the CPU 201 deletes (discards) a range outside of the set clipping range (a clipping range determined by the set clipping position and the set clipping angle) from the upload target image (an out-of-range deletion process). Subsequently, the CPU 201 ends the clipping process and causes the display screen of the display 205 to make a transition from the clipping process screen to the uploading screen. It should be noted that when the post icon is also displayed on the clipping process screen shown in FIG. 8 and the post icon is touched (when a post operation is performed), a VR image having been subjected to a clipping process on the basis of the settings may be uploaded (posted) without making a transition to the uploading screen.

As described above, according to the present embodiment, when a candidate image read as an image to be posted is a normal image, a specific display item for performing a hiding process is not displayed on a post creation screen, but when the candidate image is a VR image, the specific display item is displayed on the post creation screen. Accordingly, a portion not intended to be shared in an image to be subjected to VR display can be more reliably or more readily prevented from becoming viewable by a plurality of user before the image is shared.

Specifically, in the case of a normal image, since an entire range of the normal image is viewable in the preview region of the post creation screen, the possibility that the user does not notice an object who must be hidden is low. In addition, since a normal image is highly likely to be photographed so that only a necessary object is captured in the image by adjusting a composition upon photography, the possibility that an object who must be hidden is present in the image is low. Therefore, the necessity of prompting the user to check whether an object to be hidden is present is low, and major issues should not arise even if the specific display item (a hiding process item) for performing a hiding process is not displayed. Not displaying the hiding process items enables situations where the user loses track of operation methods or performs misoperations can be suppressed.

On the other hand, in the case of a VR image, since only a partial range of the VR image is viewable in the preview region of the post creation screen, the possibility that the user fails to notice the presence of an object to be hidden is high. Therefore, by displaying the hiding process item and prompting the user to check whether or not an object to be hidden is present, the user can conceal an object to be hidden without omission.

In addition, not displaying the hiding process item when the user realizes that the hiding process must be performed after the post creation screen is displayed necessitates temporarily closing the post creation screen and performing the hiding process by other application software or the like. Therefore, the user must go to the troubles of stopping and executing application software, newly storing or overwriting an image subjected to a hiding process, re-designating the stored image (the image subjected to the hiding process), and the like. Furthermore, temporarily closing the post creation screen causes input comments to be discarded and creates the trouble of having to input the same comments once again. The trouble related to redesignation similarly arises with respect to tagging and filtering effect adding. Such troubles can be avoided by displaying the hiding process item on the post creation screen as in the present embodiment.

It should be noted that the various controls described above as controls to be performed by the CPU 201 may be carried out by one piece of hardware or a plurality of pieces of hardware (for example, a plurality of processors or circuits) may control an entire apparatus by sharing processes.

In addition, while the present invention has been described in detail on the basis of a preferred embodiment thereof, it is to be understood that the present invention is not limited to the specific embodiment and various modes that does not constitute departures from the scope of the invention are also included in the present invention. Furthermore, the embodiment described above simply represents an example of the present invention and the embodiment can also be combined with other embodiments.

Moreover, while an example in which the present invention is applied to a smartphone has been described in the embodiment presented above, the present invention is not limited to this example and can be applied to any electronic device that enables an image to be posted. For example, the present invention can be applied to a personal computer, a PDA, a mobile phone terminal, a mobile image viewer, a printer apparatus, a digital photo frame, a music player, a game device, an electronic book reader, a video player, and the like. The present invention can also be applied to a digital camera, a television apparatus, a projection apparatus, a tablet terminal, an AI speaker, a domestic electrical appliance, a vehicle-mounted apparatus, medical equipment, and the like.

According to the present disclosure, a portion not intended to be shared in an image to be subjected to VR display can be more reliably or more readily prevented from becoming viewable by a plurality of user before the image is shared.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-232359, filed on Dec. 12, 2018, which is hereby incorporated by reference herein in its entirety.

What is claimed is:

1. An electronic device comprising at least one memory and at least one processor which function as:
a reading unit configured to read a candidate image to be posted;
a determining unit configured to determine whether the candidate image is an image for normal display or an image for VR display on a basis of attribute information of the candidate image; and
a display controlling unit configured to perform control to display a post creation screen including the candidate image such that
in a case where the read candidate image is not an image for VR display, and an image for normal display as a result of the determination, a specific display item for performing a hiding process of hiding a part of an image is not displayed on the post creation screen, and
in a case where the candidate image is an image for VR display as a result of the determination, the specific display item is displayed on the post creation screen.

2. The electronic device according to claim 1, wherein the attribute information includes at least one of metadata stored in a header of a file of the candidate image, a file name of the file, an extension of the file, and a file path of the file.

3. The electronic device according to claim 1, wherein the post creation screen includes a display item for posting the candidate image.

4. The electronic device according to claim 3, wherein the post creation screen further includes at least one of a display item for inputting a comment to be posted in association with the candidate image, a preview region for a preview display of the candidate image, a display item for tagging the candidate image, and a display item for adding a special effect concerning at least one of image brightness and image color to the candidate image.

5. The electronic device according to claim 4, wherein the post creation screen includes the preview region, and the display controlling unit performs control so that, in a case where the candidate image is an image for VR display, a part of the candidate image is displayed in the preview region as a display range.

6. The electronic device according to claim 5, wherein the display controlling unit performs control so that, in a case where the candidate image is an image for VR display, the display range to be displayed in the preview region is changed in accordance with a user operation.

7. The electronic device according to claim 4, wherein the post creation screen includes the preview region, and the display controlling unit performs control so that, in a case where the candidate image is an image for normal display, an entirety of the candidate image is displayed in the preview region.

8. The electronic device according to claim 1, wherein the candidate image becomes viewable by a plurality of users by being posted.

9. The electronic device according to claim 1, wherein by being posted, the candidate image is stored in a server of a social networking service (SNS) site and displayed on a website page of the SNS site.

10. The electronic device according to claim 1, wherein the hiding process includes a blurring process of blurring a part of an image, and
the specific display item includes a display item for performing the blurring process.

11. The electronic device according to claim 1, wherein the hiding process includes a clipping process of discarding a part of an image, and
the specific display item includes a display item for performing the clipping process.

12. The electronic device according to claim 11, wherein in a case where the candidate image is an image for VR display and the clipping process is performed on the image for VR display, an image for VR display having a range of video which is narrower than prior to performing the clipping process is generated.

13. The electronic device according to claim 1, wherein even when the candidate image is an image for VR display,
the display controlling unit performs control so as not to display the specific display item on the post creation screen in at least one of:
a case where the candidate image does not include a face;
a case where a number of faces included in the candidate image is equal to or smaller than a threshold number;
a case where a size of a face included in the candidate image is equal to or smaller than a threshold size; and
a case where a privacy setting of the candidate image meets a predetermined criteria.

14. The electronic device according to claim 1, wherein the at least one memory and at least one processor further function as a control unit,
the display controlling unit performs control so as to display a processing screen for accepting an instruction to perform the hiding process on the candidate image on a basis of the specific display item being selected by a user,
the control unit performs control so as to perform the hiding process on the candidate image on a basis of a user operation accepted in a case of displaying the processing screen, and
the display controlling unit performs control so as to display the post creation screen and display the candidate image on which the hiding process has been performed on the post creation screen on a basis of the user operation for performing the hiding process with respect to the candidate image on the processing screen and an instruction to end the processing screen.

15. The electronic device according to claim 1, wherein the hiding process is performed by an external device for disclosing posted images.

16. The electronic device according to claim 1, wherein posting of the candidate image comprises uploading the candidate image to a website or changing a privacy setting of the candidate image from a first setting that prevents the image being disclosed to others to a second setting that allows the image to be disclosed to others.

17. The electronic device according to claim 1, wherein in a case where the candidate image is displayed for the VR display on a display device, a part of the candidate image corresponding to visual field range based on an attitude of the display device is displayed on a screen of the display device.

18. The electronic device according to claim 17, wherein the visual field range of the candidate image is equal to or more than 180 degrees and is equal to or less than 360 degrees.

19. The electronic device according to claim 1, wherein the entire candidate image is displayed on a screen of a display device in a case where the candidates image is displayed for the normal display on the display device.

20. A control method of an electronic device, the control method comprising:
reading a candidate image to be posted;
determining whether the candidate image is an image for normal display or an image for VR display on a basis of attribute information of the candidate image; and
performing control to display a post creation screen such that
in a case where the read candidate image is not an image for VR display, and an image for normal display as a result of the determination, a specific display item for performing a hiding process of hiding a part of an image is not displayed on the post creation screen, and
in a case where the candidate image is an image for VR display as a result of the determination, the specific display item is displayed on the post creation screen.

21. A non-transitory computer readable medium that stores a program, wherein
the program causes a computer to execute a control method of an electronic device, the control method comprising:
reading a candidate image to be posted;
determining whether the candidate image is an image for normal display or an image for VR display on a basis of attribute information of the candidate image; and
performing control to display a post creation screen such that
in a case where the read candidate image is not an image for VR display, and an image for normal display as a result of the determination, a specific display item for performing a hiding process of hiding a part of an image is not displayed on the post creation screen, and
in a case where the candidate image is an image for VR display as a result of the determination, the specific display item is displayed on the post creation screen.

* * * * *